United States Patent [19]

Boersma et al.

[11] Patent Number: 4,527,220
[45] Date of Patent: Jul. 2, 1985

[54] MULTIPHASE SWITCHGEAR FOR HIGH VOLTAGES

[75] Inventors: Rintje Boersma, Harmelen; Marius F. F. van Wijnandsbergen, Breukelen; Gijsbert W. Irik, Bilthoven; Pieter Mariën, De Meeren, all of Netherlands

[73] Assignee: Coq B.V., Utrecht, Netherlands

[21] Appl. No.: 623,544

[22] Filed: Jun. 25, 1984

Related U.S. Application Data

[63] Continuation of Ser. No. 52,309, Jun. 26, 1979, abandoned, which is a continuation of Ser. No. 886,460, Mar. 14, 1978, abandoned.

[30] Foreign Application Priority Data

Apr. 19, 1977 [NL] Netherlands .................. 7704275

[51] Int. Cl.³ .......................................... H02B 13/00
[52] U.S. Cl. .............................. 361/332; 200/148 D; 339/22 B; 361/333
[58] Field of Search ............... 361/332, 334, 335, 341, 361/366, 333, 372–375, 378; 200/48, 148 R, 148 D, 51 R, 1 R, 5 R, 18; 339/22 B

[56] References Cited

U.S. PATENT DOCUMENTS

| | | | |
|---|---|---|---|
| 2,606,232 | 8/1952 | St. John | 361/366 |
| 2,981,814 | 4/1961 | Friedrich | 200/148 D |
| 3,235,774 | 2/1966 | Frowein | 361/335 |
| 3,767,976 | 10/1973 | Graybill | 200/148 R |
| 4,041,358 | 8/1977 | Donahue | 361/374 |

Primary Examiner—G. P. Tolin
Attorney, Agent, or Firm—Diller, Ramik & Wight

[57] ABSTRACT

Multiphase switchgear for high voltages consisting in a number of components such as switches, transformers for measurement and protection, busbars and cable connecting means, said components being interconnected by coupling elements and said components and coupling elements being provided with connecting contacts, the spatial dispositions are standardized.

13 Claims, 2 Drawing Figures

MULTIPHASE SWITCHGEAR FOR HIGH VOLTAGES

This application is a continuation of application Ser. No. 052,309, filed June 26, 1979, now abondoned, which is a rule 60 continuation of Ser. No. 886,460 filed Mar. 14, 1978, now abandoned.

BACKGROUND AND SUMMARY

The invention relates to multiphase switchgear for high voltages comprising various components such as a circuit-breaker, a current transformer, a voltage transformer, an isolator switch, busbars and cable connecting means. An object of the invention is to construct the structural components so that a satisfactorily operating system is obtained by a minimum number of parts and with comparatively high manufacturing tolerances.

This is achieved inter alia in that at least a number of said somponents are provided with stationary contacts, the spatial disposition of these contacts is the same for each component and contacts of components are connected through a coupling element with those of other components. It is thus possible to dispose a component at any desired spot in the system, since the coupling with the other components is universal.

A further simplification is obtained by the fact that all components are subjected to the same gas pressure, which means that for the insulation and the quenching of the arc produced by the switching process the same gas having the same pressure is used. A further economizing factor resides in that the tubular casing of the busbar component is a single unit, which is locked against thermal deformation by clamping. However, expansion of the busbars in their longitudinal direction is allowed. Hitherto neutralisation of the deformation has frequently been achieved by using telescopically movable connecting elements or by using elastic elements.

In the abovementioned system it is advantageous to use a coupling element comprising connecting conductors arranged in an insulator and contact pieces which are mounted at the ends of said conductors. In order to permit of coupling the components with one another despite different manufacturing tolerances of the components, the positions of the contact pieces at the one ends of the connecting conductors can be adjusted as a group with respect to the stationary contacts of components is adjustable.

This results in that a group of adjustable contacts can each time be adapted to the disposition of the co-operative stationary contacts of the component to be coupled. The adjustability is obtained in that the connecting conductors carrying the contact pieces are supported in an insulator, which is mounted for movement transversely to the longitudinal direction of said connecting conductors with respect to the frame of the component carrying the stationary contact parts. A further adjustability is obtained in that the insulator is adapted to be tilted or swivelled about a point located in the longitudinal direction of the connecting conductors. Finally an adjustability resides in that in each group each contact piece is adjustable with respect to the other contact pieces of the group. This is achieved by pivotally mounting the movable contact pieces on the connecting conductors. Moreover, the movable contact pieces may be mounted for sliding on the connecting conductors.

The invention will be elucidated more fully with reference to embodiments shown in the accompanying drawing.

In the drawing:

FIG. 1 is a diagrammatical view of multiphase switchgear in accordance with the invention and FIG. 2 is a sectional, elevational view of a coupling element connected with busbars.

DETAILED DESCRIPTION OF THE INVENTION

Figure 1:
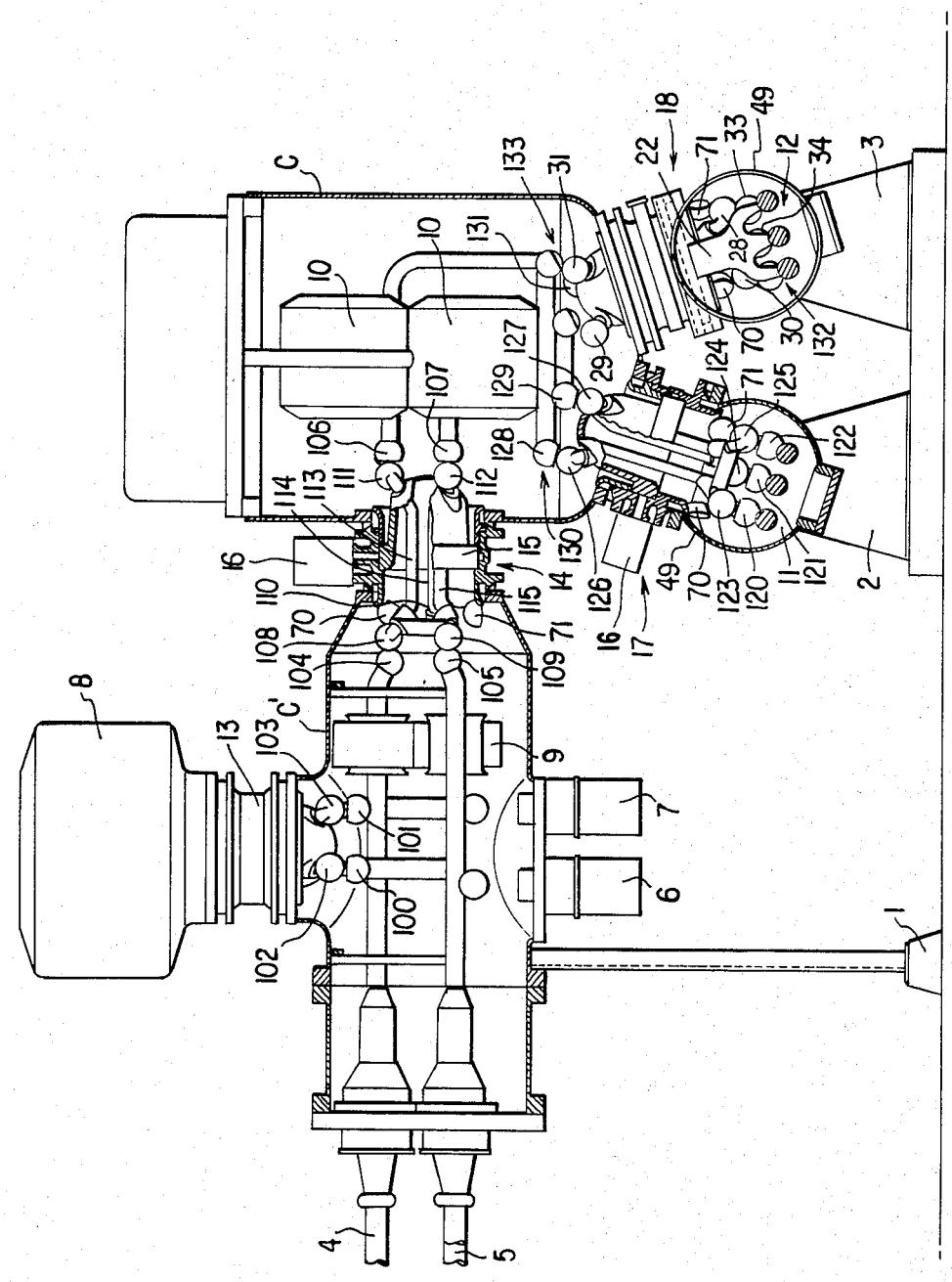

As is conventional with multiphase high voltage systems to which this invention relates, the various casing means housing bus bars and switchgear are filled with insulating gas under pressure and, to this end, the system must be gas tight for this purpose as, for example, in accord with the teachings of the Frowein U.S. Pat. No. 3,235,744 and the Graybill et al U.S. Pat. No. 3,767,976.

With the aid of tie plates 1,2 and 3 (FIG. 1) the composing components of the switchgear are secured to the ground. Functionally, the shown switchgear comprises feed cables 4 and 5, earth connectors 6 and 7, an inductive voltage transformer 8, a current transformer 9, a circuit-breaker 10 and busbars 11 and 12. The casing of these components can be coupled with one another by means of coupling elements which may be formed by bar-shaped connecting conductors supported in an insulator and having at the ends spherical contact pieces or by isolator switches, which have, apart from the aforesaid elements, a driving mechanism for moving the connecting conductors. Examples of the first coupling element are the coupling elements 13 and 18, whereas the second type of coupling element is represented by the isolator switches 14 and 17. The isolator switch 14 comprises a bushing insulator 15 and a driving mechansim 16. Thus, as shown generally in FIG. 1 and with greater particularity in FIG. 2, the casing C which houses the circuit breakers 10 is connected with the casings 49 containing the bus bar groups 11 and 12 by means of the respective coupling elements 17 and 18.

Figure 2:
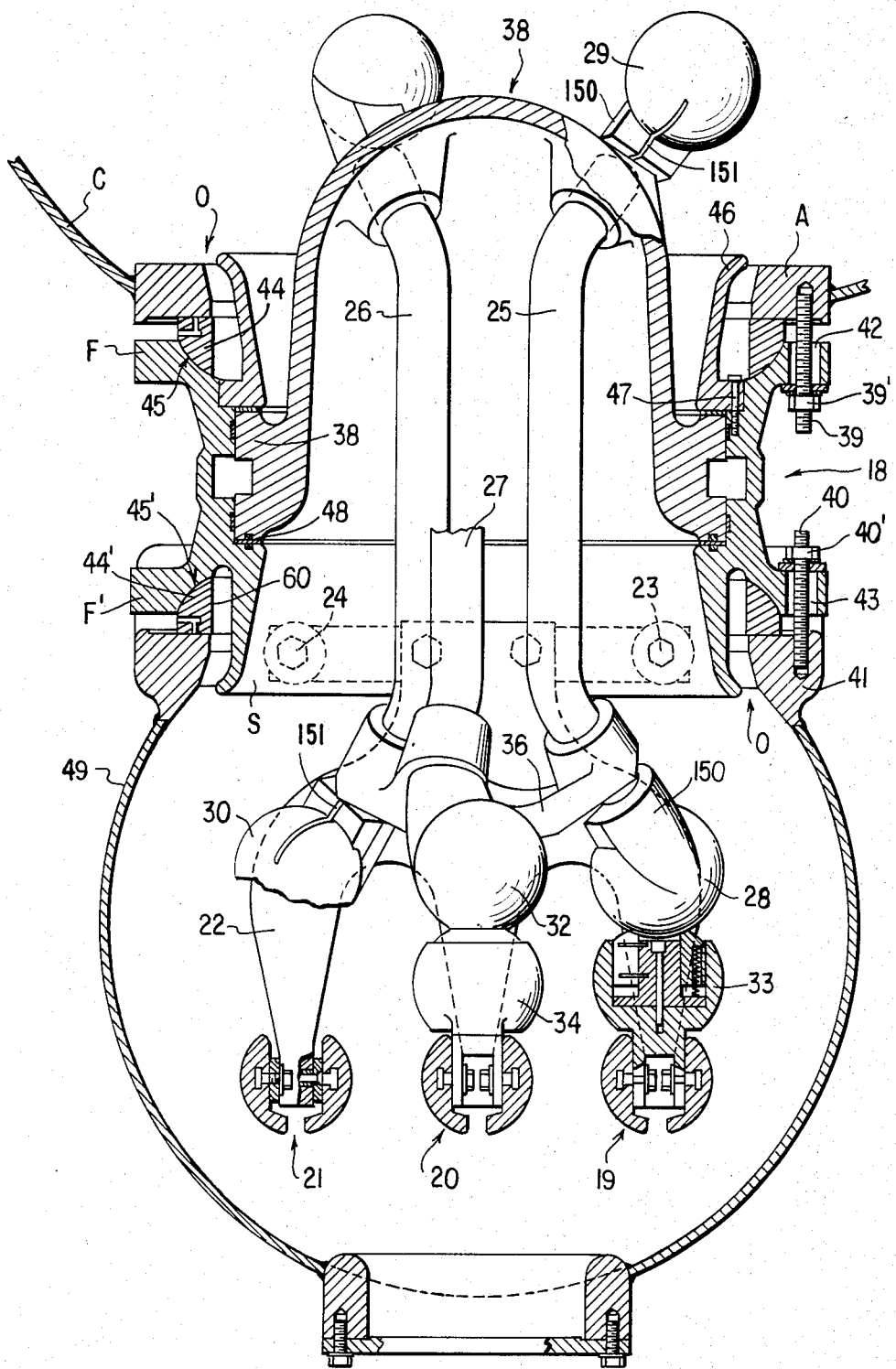

FIG. 2 shows a coupling element. The adjustability of said coupling element, say 18 (FIG. 1) is also shown therein. The busbars 19,20,21 constructed each in the form of two rods are arranged on the prongs of a tridential insulator 22 serving as a support for the busbars. The insulator 22 is fastened through an intermediate piece to the skirt portion S of the casing 37 by means of bolts 23,24. The coupling element comprises connecting conductors 25,26 and 27 having at their ends sets of three spherical contact pieces of which only those at 28,29,30,31 and 32 are shown. During the assembly of the switchgear fixed positions are chosen for the stationary contacts 33,34 and 35 on the busbars 19,20 and 21. The positions of the contacts 28,32 and 30 have to be adapted thereto so that in the coupled state a sufficient contact area is obtained. The insulator 38 is fixed in the bearing housing 37 by means of the skirt 46, which is fixed in place by means of bolts 47. Bearing and packing material 48 is arranged between the insulator 38 and the bearing housing 37. The busbars 19,20,21 interconnecting in the switching plant the different feeder units are contained in a unitary common tubular casing 49 which is rigidly fastened to the ground by the tie plates 2 and 3.

The coupling element comprises a sleeve-like housing or casing 37 having an integral skirt S at one end and a removable skirt S' at its opposite end. The two skirts cooperate to retain the base B of an insulator 38 which, in cooperation with the insulator 36, holds and positions the connecting conductors 25, 26 and 27 as shown. In addition, the casing 37 is provided with flange portions F and F' at its opposite ends, respectively having the part-spherical bearing surfaces 45 and 45'.

As shown, the casing C is provided with an access opening bounded by the annular member A and the flange F is affixed thereto by means of a plurality of studs, such as at 39, and associated nuts 39' which pass through oversize openings 42 in the flange F. Similarly, the access opening O in the casing 49 of the bus bar component is bounded by the ring 41 which carries studs such as 40 passing through oversize openings 43 in the flange F'. Seated between the members A and 41 and the respective bearing surfaces 45 and 45' of the flanges F and F' are the bearing ring 44 and 44'. Thus, by adjusting the nuts 39' and 40' on their respective studs at each end of the coupling element 18, the proper alignment thereof with respect to the two casings C and 49 can be achieved.

In respect to this, it will be appreciated that each component casing is provided with one or more access openings through which its various contacts are exposed. Thus, in FIG. 1, the casing C' has an access opening through which the contacts 100,101 are exposed whereas the casing of the component 8 has a similar opening and set of contacts. In this case, the coupling element 13, similar to that shown in FIG. 2, interconnects these casings at their access openings and, simultaneously, establishes electrical connection between the two sets of contacts through the intermediary of its connecting conductors and their associated contacts 102, 103. This is more clearly evident for the access openings of the casings C' and C which expose the respective component contacts 104, 105 and 106, 107, where the sleeve-like casing of the coupling element 14 joins these two casings with the contacts 108, 109, 110, 111 and 112 of its connecting conductors 113, 114 and 115 bridging between the two sets of component contacts. Although all three component contacts of each set thereof and all three of the contacts at each end of the connecting conductors are not shown, for the sake of clarity, it will be appreciated that in each case the arrangement is similar to that illustrated more completely in FIG. 2.

The movable contacts 28,29,30,31 and 32 are pivotally mounted on their associated arms. This provides the possibility of adjusting the contact concerned with respect to the other contacts of the group.

It should be noted that by adding a driving mechanism (such as the driving mechanisms 16 for the isolator switches 14 and 17) the coupling elements 13 and 18 may also be used as isolator switches. The isolator switch is capable of switching between a position, in which the contact pieces of the connecting conductors are in contact with stationary contacts, and a position, in which a connection is established with grounded, spherical contacts 70,71 (see FIG. 1).

In FIG. 1, the bus bar contacts 120, 121 and 122 are engaged by the connecting conductor contacts 123, 124 and 125 whereas the contacts at the other ends of the connecting conductors, only two of which (126 and 127) are shown, are in engagement with corresponding component contacts such as 128 and 129 of the component contact set 130, whereas the connecting conductor contacts 28, 30, 32 and 29, 31 131 are out of engagement with the corresponding component contact sets 132 and 133. Thus, the isolator switch formed by the assembly 17 is in "on" position whereas that formed by the assembly 18 is in "off" position with the contacts such as 70,71. The "off" or "on" condition is effected by rotation of the insulator 38 in each case, for which actuators such as 16 are provided. For the purpose of clarity, the drive connection between the drive mechanism 16,16 of FIG. 1 and their respective bushing insulators 15 are not shown, but any conventional connection such as a pinion and ring gear, etc. may be employed.

The component contacts are disposed in a predetermined spatial pattern. As shown in FIGS. 1 and 2, they are arranged in a generally circular pattern essentially in a common plane. The coupling means is so constructed as to allow several adjustments to achieve alignment and engagement of its contacts with the component contacts of the two components joined thereby. Thus, limited lateral positioning of the member F with respect to the two components in FIG. 2 is allowed by virtue of the oversize holes 42, 43, and these oversize holes also allow relative swivelling of the coupling means relative to the two components. This eliminates the necessity of absolutely precise alignment between the access openings O of the two components. Needless to say, when such alignment-compensating adjustments are necessary, it will be necessary also to adjust the various connecting conductor contacts so that good engagement with the corresponding sets of component contacts is achieved. For this purpose, each connecting conductor contact is provided with a female base 150 receiving the end of its corresponding connecting conductor, each base being slotted as shown at 151 to allow pivotal and longitudinal sliding adjustment on its conductor. The base is offset with respect to the spherical part of the contact so that when rotated, the spatial position of the contact is altered. Thus, the various contacts such as 28, 30, 32 in FIG. 2 are rotated so that their spatial pattern coincides with the spatial pattern of the contacts 33, 34 and 35 (see also FIG. 1). Lastly, the slotted bases 150 of the contacts allow them to be shifted longitudinally on the ends of the connecting conductors, thus allowing each such contact to be positioned for proper engagement against a component contact.

What we claim is:

1. In an electrical distribution system for multiphase high voltage, the combination of a plurality of electrical components each having a plurality of conductors and casing means enclosing the conductors thereof, the conductors of each component having at least one group of stationary contacts associated therewith and each casing means having at least one access opening exposing such group of contacts, the contacts of each group being disposed in essentially the same spatial pattern, and coupling means joining said casing means at said access openings thereof for electrically connecting the groups of stationary contacts exposed at such access openings, each coupling means comprising a housing, mounting means at the opposite ends of said housing joining the respective casing means of adjacent components at the access openings thereof, an insulator carried within said housing, and electrical conductors carried by said insulator and having contacts at their opposite ends engaging the respective groups of stationary contacts of such adjacent components, said mounting means including screw threaded elements and oversize openings in said housing for allowing pivotal positioning of said housing with respect to the casing means of said adjacent components.

2. In an electrical distribution system as defined in claim 1 wherein said mounting means include part-spherical rings to allow swivelling of said housing relative to the casing means of said adjacent components.

3. In an electrical distribution system as defined in claim 2 wherein the contacts of said coupling means are rotatably mounted on the ends of their respective conductors whereby to match the spatial pattern of the stationary contacts with which they are engaged.

4. In an electrical distribution system as defined in claim 3 wherein said contacts of said coupling means are slidable on their respective conductors whereby to engage against the stationary contacts with which they are associated.

5. In an electrical distribution system for multiphase high voltage, the combination of a plurality of electrical components each having a plurality of conductors and casing means enclosing the conductors thereof, the conductors of each component having at least one group of stationary contacts associated therewith and each casing means having at least one access opening exposing such group of contacts, the contacts of each group being disposed in essentially the same spatial pattern, and coupling means joining said casing means at said access openings thereof for electrically connecting the groups of stationary contacts exposed at such access openings, each coupling means comprising a housing, mounting means at the opposite ends of said housing joining the respective casing means of adjacent components at the access openings thereof, an insulator carried within said housing, and electrical conductors carried by said insulator and having contacts at their opposite ends engaging the respective groups of stationary contacts of such adjacent components, said mounting means including part-spherical rings to allow swivelling of said housing relative to the casing means of said adjacent components, the contacts of said coupling means being rotatably mounted on the ends of their respective conductors whereby to match the spatial pattern of the stationary contacts with which they are engaged.

6. In an electrical distribution system as defined in claim 5 wherein said contacts of said coupling means are slidable on their respective conductors whereby to engage against the stationary contacts with which they are associated.

7. In a multiphase, a high voltage electrical distribution system including a plurality of bus bars and tubular casing means enclosing said bus bars in gas tight fashion for retaining an insulating gas under pressure, and at least one electrical component including a plurality of conductors and second casing means enclosing said conductors in gas tight fashion for retaining an insulating gas under pressure, the improvement wherein:
said bus bars are provided with a group of stationary contacts and the conductors of said component are provided with a group of stationary contacts, the contacts of each group being disposed in essentially the same spatial pattern, said tubular casing means having an access opening exposing that group of said stationary contacts connected to said bus bars and said second casing means having an access opening exposing said group of stationary contacts on said conductors;
coupling means joining said tubular casing means to said second casing means at said access openings for maintaining the gas tight enclosures of said casing means while establishing electrical contact between said group of stationary contacts on said bus bars and said group of stationary contacts on said conductors through the access opening of said tubular casing means and the access opening of said second casing means, said coupling means including a plurality of further conductors having further groups of contacts at the opposite ends thereof, the contacts of said further groups being individually adjustable on said further conductors so as to match the spatial pattern of the stationary contacts with which they are engaged, the contacts of said coupling means being rotatably mounted on the ends of their respective conductors whereby to match the spatial pattern of the stationary contacts with which they are engaged.

8. In an electrical distribution system as defined in claim 7 wherein said contacts of said coupling means are slidable on their respective conductors whereby to engage against the stationary contacts with which they are associated.

9. In an electrical distribution system for multiphase high voltage, the combination of a plurality of electrical components each having a plurality of conductors and casing means enclosing the conductors thereof in gas tight fashion for retaining an insulating gas under pressure, the conductors of each component having at least one group of stationary contacts associated therewith and each casing means having at least one access opening exposing such group of contacts, the contacts of each group being disposed in essentially the same spatial pattern, and coupling means joining said casing means at said access openings thereof for maintaining the gas tight enclosures of said casing means while electrically connecting the groups of stationary contacts exposed at such access openings, each coupling means comprising a housing, mounting means at the opposite ends of said housing joining the respective casing means of adjacent components at the access openings thereof, an insulator carried within said housing, and electrical conductors carried by said insulator and having contacts at their opposite ends engaging the respective groups of stationary contacts of such adjacent components, the contacts of said coupling means being rotatably mounted on the ends of their respective conductors whereby to match the spatial pattern of the stationary contacts with which they are engaged.

10. In an electrical distribution system as defined in claim 9 wherein said contacts of said coupling means are slidable on their respective conductors whereby to engage against the stationary contacts with which they are associated.

11. In an electrical distribution system for multiphase high voltage, the combination of a plurality of electrical components each having a plurality of conductors and casing means enclosing the conductors thereof in gas tight fashion for retaining an insulating gas under pressure, the conductors of each component having at least one group of stationary contacts associated therewith and each casing means having at least one access opening exposing such group of contacts, the contacts of each group being disposed in essentially the same spatial pattern, and coupling means joining said casing means at said access openings thereof for maintaining the gas tight enclosures of said casing means while electrically connecting the groups of stationary contacts exposed at such access openings, said coupling means including a plurality of further conductors having further groups of contacts at the opposite ends thereof, the contacts of said further groups being individually adjustable on said further conductors so as to match the predetermined pattern and to engage against the stationary contacts with which they are associated, said contacts of said further groups being slidable and pivotable on said further conductors.

12. In an electrical distribution system for multiphase high voltage, the combination of a plurality of electrical components each having a plurality of conductors and casing means enclosing the conductors thereof in gas tight fashion for retaining an insulating gas under pressure, the conductors of each component having at least one group of stationary contacts associated therewith and each casing means having at least one access opening exposing such group of contacts, the contacts of each group being disposed in essentially the same spatial pattern, and coupling means joining said casing means at said access openings thereof for maintaining the gas tight enclosures of said casing means while electrically connecting the groups of stationary contacts exposed at such access openings, each coupling means comprising a housing, mounting means at the opposite ends of said housing joining the respective casing means of adjacent components at the access openings thereof for allowing adjustable positioning of said housing with respect to said casing means and, an insulator carried within said housing, and electrical conductors carried by said insulator and having contacts at their opposite ends engaging the respective groups of stationary contacts of such adjacent components, the contacts of said coupling means being rotatably mounted on the ends of their respective conductors whereby to match the spatial pattern of the stationary contacts with which they are engaged.

13. In an electrical distribution system as defined in claim 12 wherein said contacts of said coupling means are slidable on their respective conductors whereby to engage against the stationary contacts with which they are associated.

* * * * *